United States Patent
Ley

(10) Patent No.: US 7,278,805 B2
(45) Date of Patent: Oct. 9, 2007

(54) CUTTING INSERT FOR EFFECTIVE CHIP CONTROL

(75) Inventor: Joseph J. Ley, Rogers, AR (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/242,193

(22) Filed: Oct. 3, 2005

(65) Prior Publication Data

US 2007/0077130 A1    Apr. 5, 2007

(51) Int. Cl.
B23B 27/22 (2006.01)
(52) U.S. Cl. ............... 407/114; 407/107; 407/113; 407/115; 407/116; 407/117
(58) Field of Classification Search ........ 407/113–116, 407/107, 117; B23B 27/22
See application file for complete search history.

(56) References Cited

U.S. PATENT DOCUMENTS

| | | | | |
|---|---|---|---|---|
| 3,395,434 A | * | 8/1968 | Wirfelt | 407/114 |
| 4,215,957 A | * | 8/1980 | Holma et al. | 407/114 |
| 4,340,325 A | * | 7/1982 | Gowanlock | 407/116 |
| 4,344,725 A | | 8/1982 | Seidel | |
| 4,988,242 A | * | 1/1991 | Pettersson et al. | 407/114 |
| 5,074,720 A | * | 12/1991 | Loqvist et al. | 407/114 |
| 5,076,739 A | * | 12/1991 | Pano | 407/114 |
| 5,282,703 A | * | 2/1994 | Itaba et al. | 407/114 |
| 5,525,016 A | * | 6/1996 | Paya et al. | 407/116 |
| 5,630,681 A | * | 5/1997 | Paya | 407/114 |
| 5,660,507 A | * | 8/1997 | Paya | 407/114 |
| 5,688,081 A | * | 11/1997 | Paya | 407/115 |
| 5,695,303 A | * | 12/1997 | Boianjiu et al. | 407/114 |
| 5,758,994 A | * | 6/1998 | Hintze et al. | 407/116 |
| 5,772,365 A | * | 6/1998 | Vogel et al. | 407/42 |
| 5,791,833 A | | 8/1998 | Niebauer | |
| 5,810,520 A | * | 9/1998 | Hintze et al. | 407/114 |
| 5,839,858 A | * | 11/1998 | Paya et al. | 407/114 |
| 5,876,154 A | * | 3/1999 | Enderle | 407/114 |
| 5,921,722 A | * | 7/1999 | Paya et al. | 407/114 |
| 5,967,710 A | * | 10/1999 | Krenzer | 408/224 |
| 6,164,879 A | | 12/2000 | Krenzer | |
| 6,186,705 B1 | * | 2/2001 | Kumar et al. | 407/114 |
| RE37,595 E | * | 3/2002 | Lindstedt | 407/116 |
| 6,843,620 B2 | * | 1/2005 | Inayama | 407/114 |
| 2002/0197119 A1 | * | 12/2002 | Kinukawa | 407/114 |

FOREIGN PATENT DOCUMENTS

WO    WO95/29782 A1    11/1995

\* cited by examiner

Primary Examiner—Monica Carter
Assistant Examiner—Sara Addisu
(74) Attorney, Agent, or Firm—Larry R. Meenan

(57) ABSTRACT

A cutting insert includes a polygonal body having an upper chip surface, a bottom surface and a peripheral edge surface extending therebetween. The peripheral edge surface intersects the upper chip surface to form a main cutting edge. The upper chip surface defines a chip face including a chip former comprising a wall extending downwardly from an elevated plateau to a cutting edge having a plurality of chip forming grooves and a rib formed between adjacent chip forming grooves. The chip former of the cutting insert effectively controls the formation of a chip by forming the chip to a desired shape and guiding the chip to an obstruction that impedes chip flow until the chip breaks.

17 Claims, 5 Drawing Sheets

CUTTING INSERT FOR EFFECTIVE CHIP CONTROL

BACKGROUND OF THE INVENTION

The present invention relates to a cutting insert for effective chip control while performing a machining operation, such as a bar peeling operation, by including an upper chip or rake face that guides and bends the chip to generate a chip that is controlled and broken.

Bar peeling is a metal working operation in which a bar is diametrically reduced while traveling through a rotary cutter head provided with several tools, such as cutting inserts, arranged in circumferentially spaced apart relationship around the blank. The blank is typically formed by hot rolling that forms surface imperfections, such as a thin layer of oxide scale, mill scale, surface cracks, and the like. The size of the blank can vary from 0.16 inch to over 15.7 inches in diameter. Bar peeling also can be applied to thick walled tubes.

The most common materials that are peeled are carbon and alloy steel, high-temperature steel, cobalt, nickel, titanium, aluminum, uranium and their alloys.

Application areas vary, but bar peeled blanks are often used as an intermediate stage in the production of products that are to be further processed, for example, extrusion blanks for tube manufacturing and axle components for the automotive industry.

Compared with conventional turning, bar peeling is a method of machining that provides high productivity and low production costs due to the shorter throughput times. The surface quality and dimensional tolerances are often sufficient to reduce machining at subsequent stages.

BRIEF SUMMARY OF THE INVENTION

A cutting insert for effective chip control comprises a polygonal body having an upper chip surface, a bottom surface and a peripheral edge surface extending therebetween. The peripheral edge surface intersects the upper chip surface to form a main cutting edge. The upper chip surface defines a chip face including a chip former comprising an elevated plateau and a downwardly sloping concave-shaped wall having a plurality of chip forming grooves and a rib formed between adjacent chip forming grooves. The chip former of the cutting insert effectively controls the formation of a chip by forming the chip to a desired shape and guiding the chip to an obstruction that impedes chip flow until the chip breaks.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
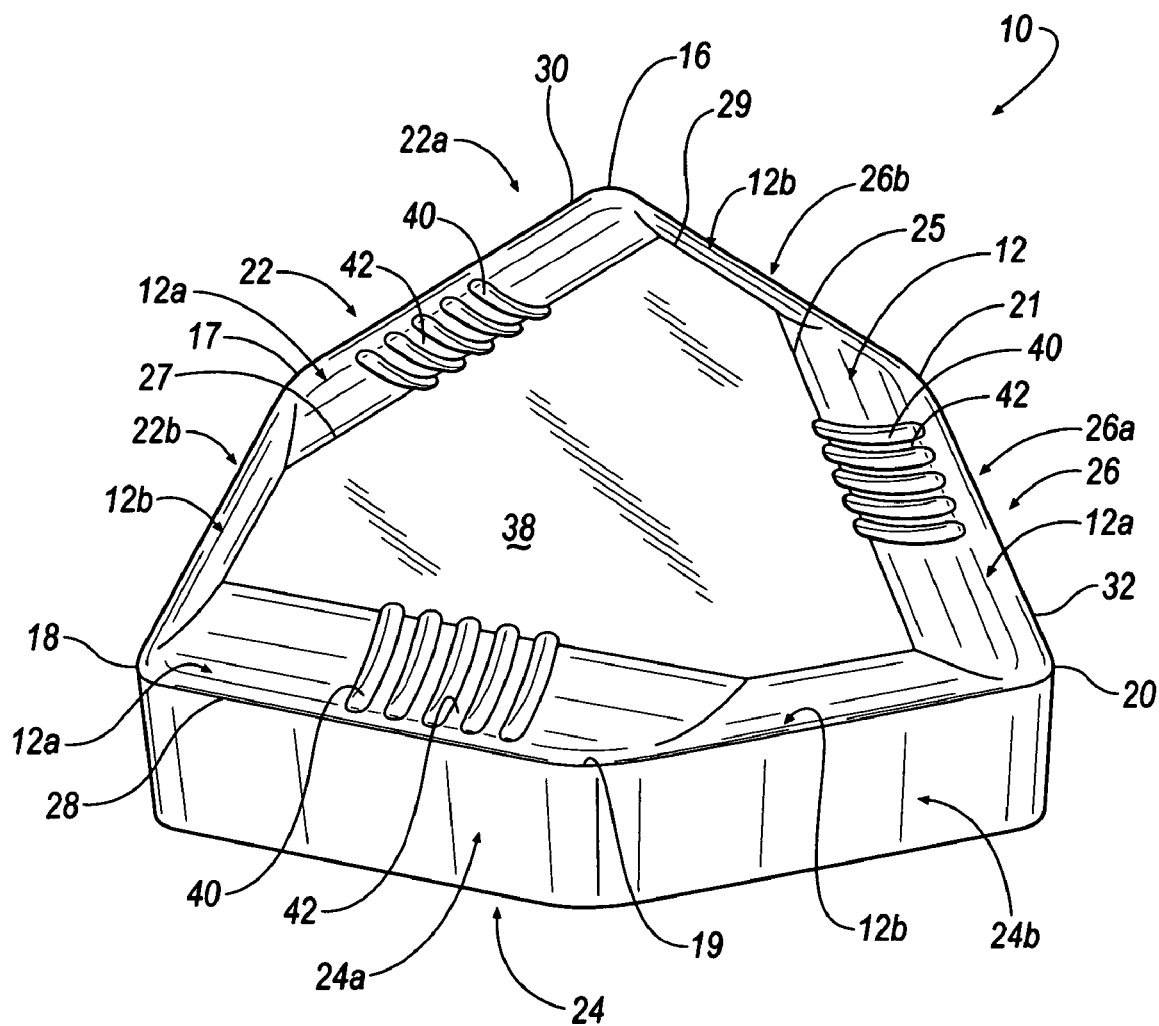
FIG. 1 shows a perspective view of a cutting insert with effective chip control according to an embodiment of the invention.
Figure 2:
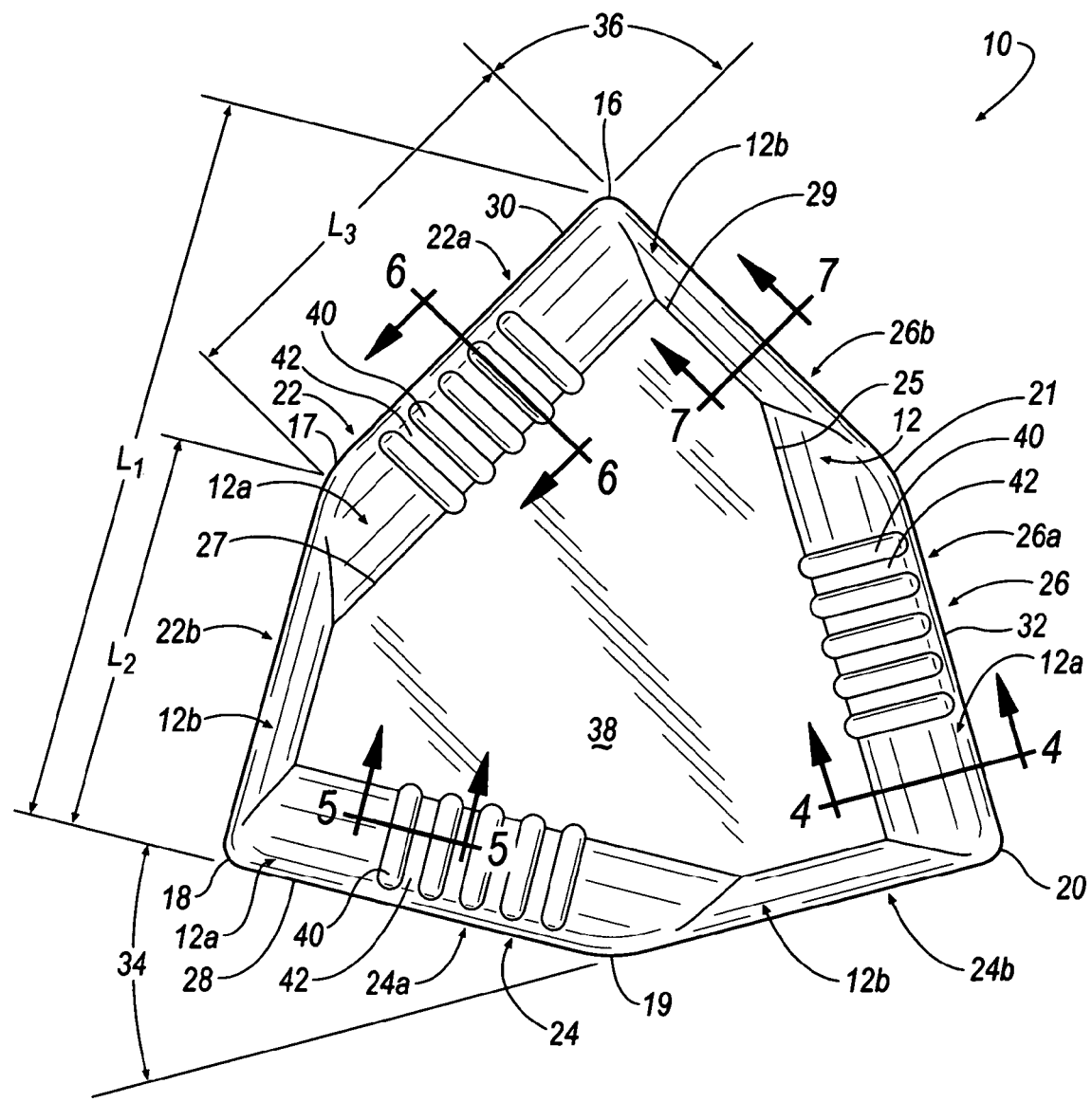
FIG. 2 shows a top view the cutting insert of FIG. 1.
Figure 3:
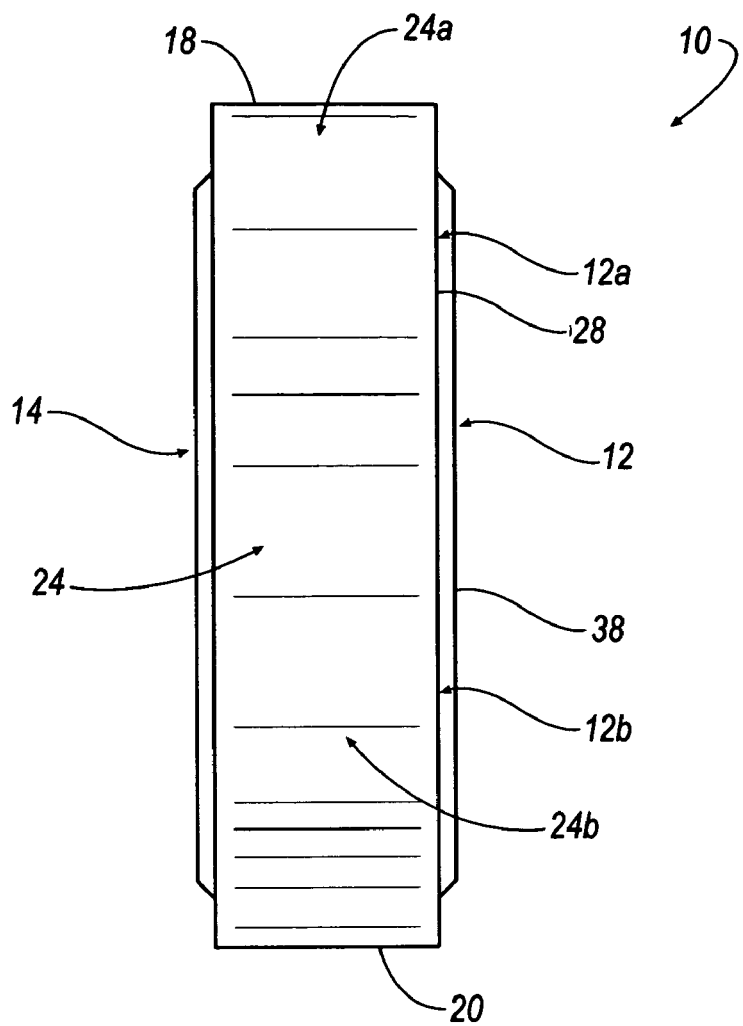
FIG. 3 shows a side view of the cutting insert of FIG. 1.

Referring now to FIGS. 1-8, a cutting insert 10 is illustrated according to an embodiment of the invention. In general, the insert 10 is defined by a polygonal-shaped body formed of wear resistant material. The insert 10 includes an upper chip face, shown generally at 12, and an opposite bottom face, shown generally at 14. The insert 10 is generally triagonal in shape with three radiused acute corners 16, 18, 20 having a radius of approximately 0.0468 inches and defining three peripheral edge surfaces 22, 24, 26, each having a length, $L_1$, which are located between the faces 12, 14. In the illustrated embodiment, the length, $L_1$, is approximately equal to 1.3137 inches.

Each peripheral edges surface 22, 24, 26 of the insert 10 includes three radiused obtuse corners 17, 19, 21 having a radius of approximately 0.300 inches and separating each peripheral edge surface 22, 24, 26 into a first portion 22a, 24a, 26a and a second portion 22b, 24b, 26b, respectively. For example, the obtuse corner 17 separates the peripheral edge surface 22 into a first portion 22a having a length, L2, of approximately 0.713 inches, and a second portion 22b having a length, L3, approximately equal to L2. During operation, stock to be removed progressively decreases along the obtuse corner 19 from the first portion 22a to the second portion 22b. The intersection between the upper chip face 12 and the first portions 22a, 24a, 26a of the peripheral edge surfaces 22, 24, 26 define main cutting edges 28, 30, 32, respectively. The first portions 22a, 24a, 26a define an angle 34 of approximately thirty (30) degrees with respect to their respective second portions 22b, 24b, 26b, and vice versa. In addition, the peripheral edge surfaces 22a, 26b define an angle 36 of approximately ninety (90) degrees with respect to each other. Similarly, the peripheral edge surfaces 22b, 24a define an angle approximately equal to angle 36 with respect to each other. Likewise, the peripheral edge surfaces 24b, 26a define an angle approximately equal to angle 36 with respect to each other.

One aspect of the invention is that the insert 10 achieves effective chip control at various cutting depths and feed rates. In order to achieve effective chip control, the upper chip face 12 includes a chip former comprising a wall 12a extending downwardly from an elevated plateau 38 to the main cutting edges 28, 30, 32. The downwardly-extending wall 12a has a plurality of chip forming channels or grooves 40, and a rib 42 formed between adjacent chip forming grooves 40. In general, the chip former defines the size and the shape of the chip depending on the desired feed rate of the workpiece. For example, the bending moment of the chip is affected by the distance and the difference in height between the elevated plateau 38 and the main cutting edges 28, 30, 32.

During a machining operation, the chip begins to shear as the chip engages the wall 12a. As the chip engages the groove 40, the groove 40 causes the chip to become more constricted by increasing the bending moment of the chip. This increase in the bending moment of the chip causes the chip to slightly lift and separate from the insert 10, thereby helping to guide the chip toward the elevated plateau 38. After the chip clears the elevated plateau 38, the chip will eventually engage an obstruction that impedes chip flow causing the expanding chip to break. The obstruction can be, for example, the chip bending upon itself and breaking its own back, by engaging the elevated plateau 38, or by engaging any other desired obstruction.

In the illustrated embodiment, the wall 12a is in the form of three concave-shaped walls 12a sloping downwards from the elevated plateau 38 that is formed substantially parallel with respect to the upper chip surface 12 and the bottom surface 14. Alternatively, the invention can be practiced using a shelf and a shoulder, rather than the concave-shaped walls 12a. However, by using a concave or arch-shaped wall, the chip bending force that the insert must withstand is more uniformly spread, and therefore, is decreased, as compared to the shelf and shoulder profile that tends to concentrate the chip bending force at a particular area. Because the insert 10 is generally triagonal in shape, three sets of grooves 40 and ribs 42 are spaced approximately one hundred twenty (120) degrees apart from each other on the concave-shaped walls 12a. In the illustrated embodiment, the walls 12a defining the chip former include five (5) grooves 40 forming four (4) ribs 42 therebetween. However, the invention can be practiced with any desirable number of grooves 40 and ribs 42 to achieve the desired chip control for a desired feed rate of the workpiece.

Figure 4:
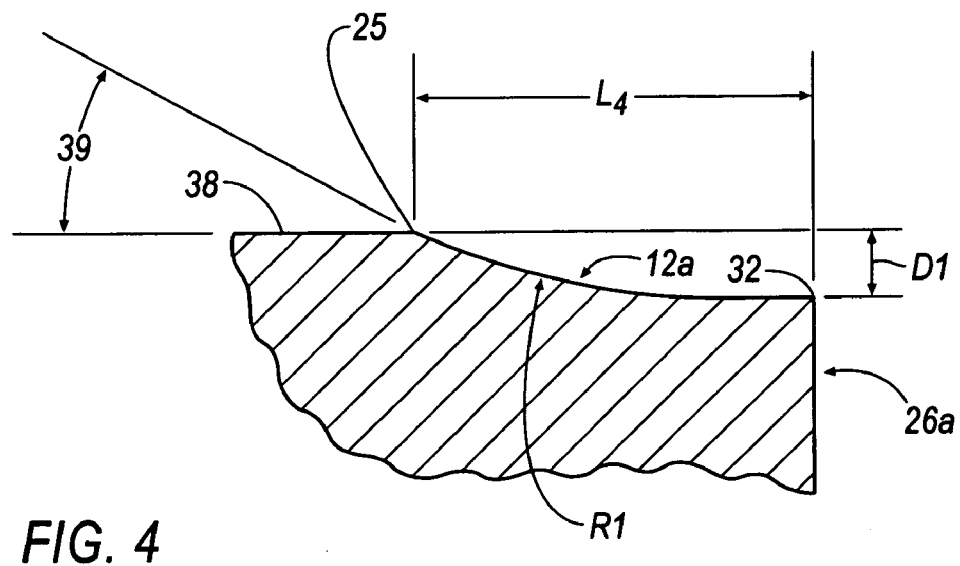
FIG. 4 shows a cross-sectional view of the cutting insert taken along line 4-4 of FIG. 2.

As seen in FIG. 4, the concave-shaped walls 12a in which the grooves 40 and ribs 42 are absent slope downward a distance, D1, and a length, $L_4$, from the elevated plateau 38 to peripheral edge surfaces 22a, 24a, 26a. The downwardly sloping concave wall 12a forms an angle 39 at a point 25 where the wall 12a intersects the elevated plateau 38. In the illustrated embodiment, the angle 39 is forty-five (45) degrees or less, for example, approximately twenty-five (25) degrees, at the point 25 where the wall 12a intersects the elevated plateau 38. However, the invention can be practiced with any desired angle 39 to cause the chip to bend and form a curling pattern as the chip moves along the concave-shaped walls 12a during machining operations. The concave wall 12a defines a radius, R1, from the peripheral edge surface 22a, 24a, 26a to the elevated plateau 38. In the illustrated embodiment, the radius, R1, is approximately equal to 0.375 inches. However, the radius, R1, may vary depending on the desired feed rate of the workpiece.

Figure 5:
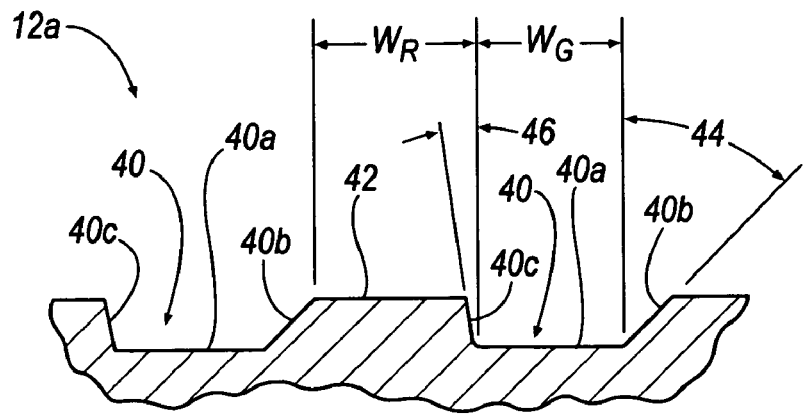
FIG. 5 shows a cross-sectional view of the cutting insert taken along line 5-5 of FIG. 2.

As seen in FIG. 5, each channel or groove 40 includes a bottom wall 40a, a first side wall 40b and a second side wall 40c. The first side wall 40b forms an angle 44 of approximately forty-five (45) degrees with respect to a plane perpendicular to the bottom wall 40a. The first side wall 40b allow the chip to easily flow along the groove 40 toward the elevated plateau 38 without binding. The second side wall 40c forms an angle 46 of approximately ten (10) degrees with respect to the plane perpendicular to the bottom wall 40a to provide some degree of draft for the chip and to avoid a sharp (90 degree) profile. The second side wall 40c performs the function of a directional control channel for the chip when flowing along the groove 40 toward the elevated plateau 38. Each rib 42 is formed by the second side wall 40c of one groove 40 and the first side wall 40b of an adjacent groove 40. Each groove 40 has a width, $W_G$, and each rib 42 has a width, $W_R$. The width, $W_G$, is such that the chip tightly curls when moving along the groove 40 toward the elevated plateau 38. In the illustrated embodiment, the width, $W_G$, of the groove 40 is approximately equal to the width, $W_R$ of the rib 42. However, the invention can be practiced in which the width, $W_G$, is not equal to the width, $W_R$. Because the grooves 40 are "carved out" of the concave-shaped wall 12a, the ribs 42 are approximately the same elevation as the wall 12a. The side walls 40b, 40c may be interchanged, depending on the direction of the desired chip flow.

Figure 6:
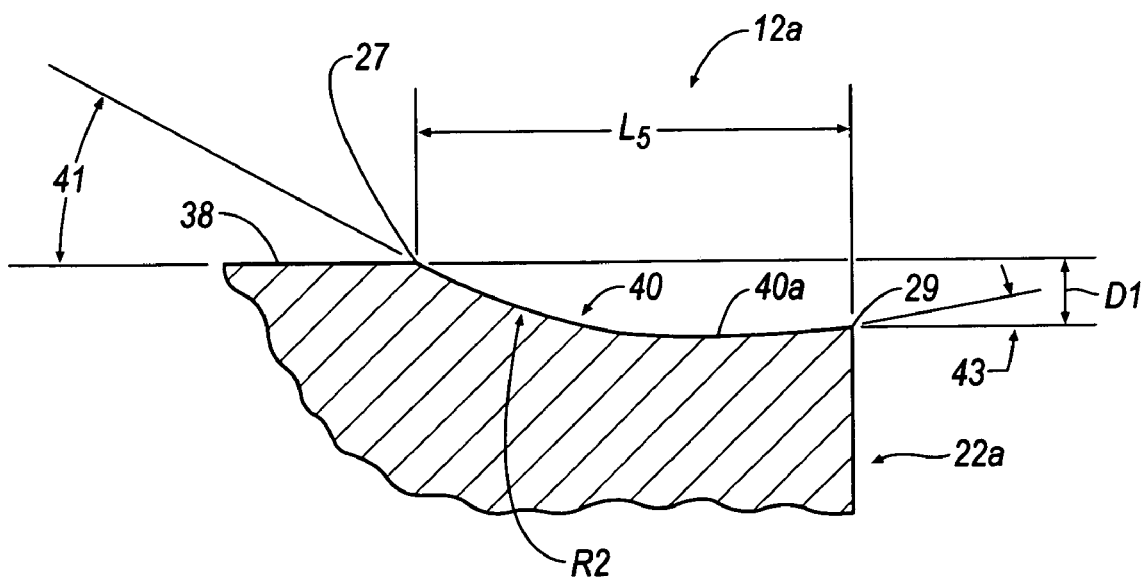
FIG. 6 shows a cross-sectional view of the cutting insert taken along line 6-6 of FIG. 2.

As seen in FIG. 6, each groove 40 formed in the concave-shaped wall 12a has a length, $L_5$, from the elevated plateau 38 to the peripheral edge surfaces 22a, 24a, 26a. The groove 40 forms an angle 41 at a point 27 where the groove 40 intersects the elevated plateau 38. In the illustrated embodiment, the angle 41 is approximately thirty-one (31) degrees at the point 27 where the groove 40 intersects the elevated plateau 38. However, the invention can be practiced with any desired angle 41 to cause the chip to bend into a tight curling pattern and then eventually break as the chip flows along the groove 40 during machining operations. In addition, the groove 40 forms an angle 43 at a point 29 where the groove 40 intersects the peripheral edge surface 22a (also peripheral edge surfaces 24a, 26a). In the illustrated embodiment, the angle 43 is approximately ten (10) degrees at the point 29 where the groove 40 intersects the peripheral edge surface 22a. However, the invention can be practiced with any desired angle 41 to cause the chip to bend and form a desired tight curling pattern and eventually break at a desired length as the chip flows along the groove 40. To accomplish the desired bending and curling of the chip, the groove 40 defines a radius, R2, from the peripheral edge surface 22a, 24a, 26a to the elevated plateau 38. In the illustrated embodiment, the radius, R2, is approximately equal to 0.28125 inches. However, the radius, R2, may vary depending on the feed rate of the workpiece.

Figure 7:
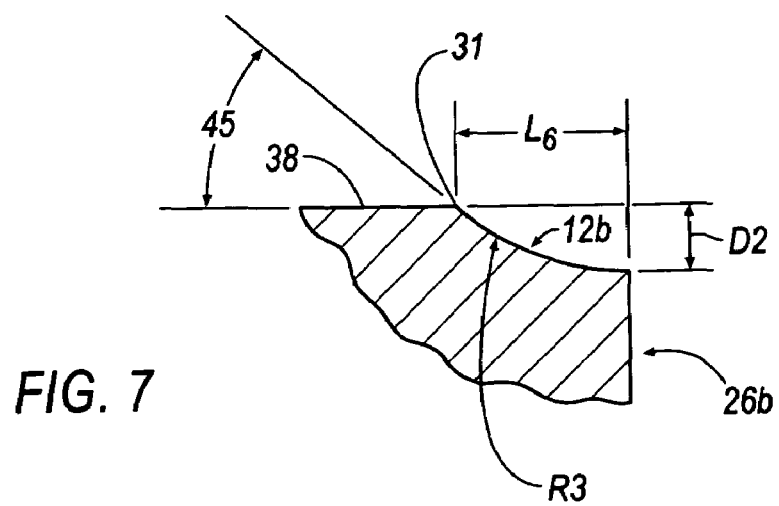
FIG. 7 shows a cross-sectional view of the cutting insert taken along line 7-7 of FIG. 2.

As seen in FIG. 7, the upper chip face 12 also includes three concave-shaped walls 12b that slope downward a distance, D2, and has a length, $L_6$, from the elevated plateau 38 to peripheral edge surfaces 22b, 24b, 26b. The downwardly sloping concave walls 12b form an angle 45 at a point 31 where the concave-shaped wall 12b intersects the elevated plateau 38. In the illustrated embodiment, the downwardly sloping concave-shaped walls 12b form an angle 45 of approximately forty-five (45) degrees. However, the invention is not limited by the angle 45 of the concave-shaped wall 12b. The concave-shaped wall 12b defines a radius, R3, from the peripheral edge surface 22b, 24b, 26b to the elevated plateau 38. In the illustrated embodiment, the radius, R3, is approximately equal to 0.120 inches. However, the radius, R3, may vary depending on the feed rate of the workpiece. It should be noted that the concave-shaped walls 12b are not main cutting edges that are involved in chip control, unlike the concave-shaped walls 12a, but rather perform a function as a wiper during machining operations.

It should be noted that the insert 10 includes three walls 12a, 12b because the insert 10 is generally triagonal in shape with three peripheral sides 22, 24, 26 (i.e., a trigon). However, it will be appreciated that the invention can be practiced with any desirable number of chip forming walls depending on the number of peripheral sides. For example, the insert may have four chip forming walls in the case where the insert has generally four peripheral sides.

Figure 8:
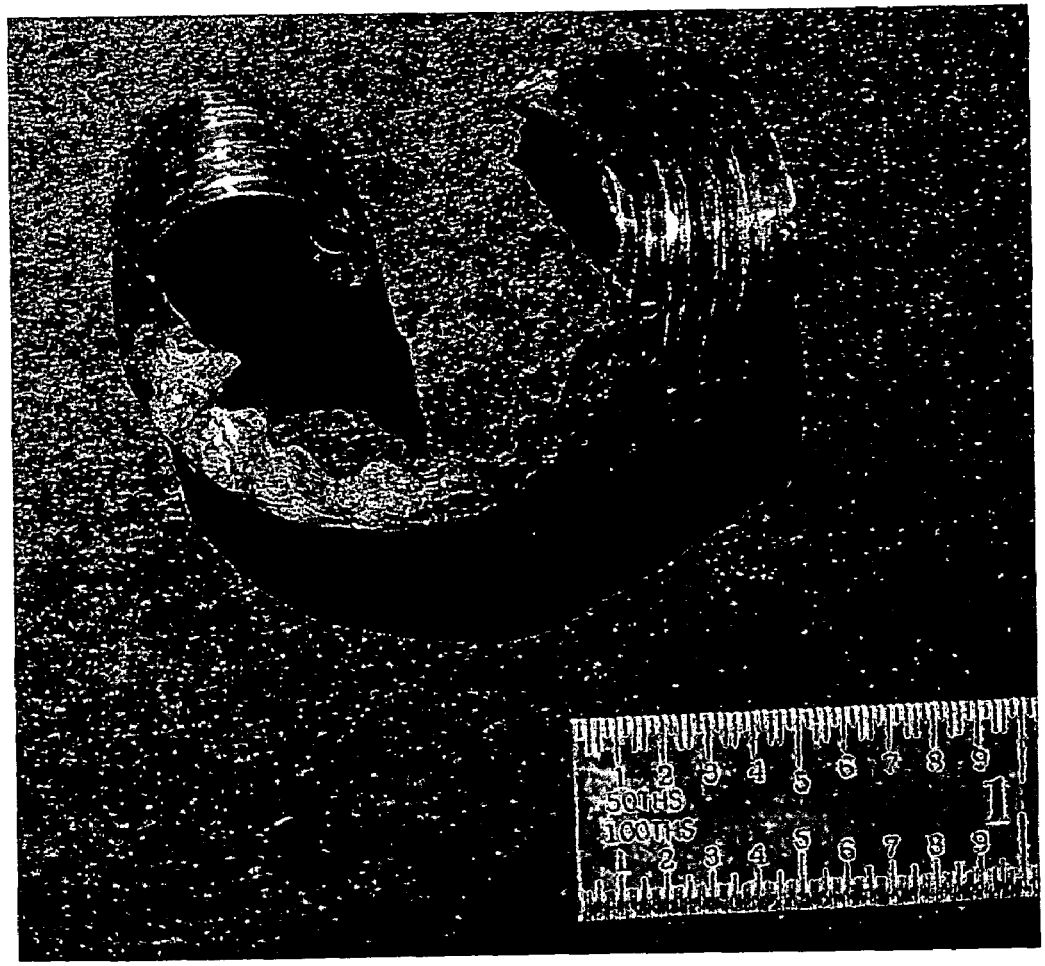
FIG. 8 shows a photograph of representative chips formed using the cutting insert of the invention.

As described above, one aspect of the invention is that the insert 10 achieves effective chip control at various cutting depths and feed rates during a machining operation, such as a bar peeling operation, turning operation, and the like. Specifically, tests have been conducted using the cutting insert 10 of the invention. During testing, the cutting insert 10 demonstrated that the formation of the chip is effectively constricted and controlled by the chip former, resulting in the chip forming a generally circular shape, similar to a number nine (9), a letter "C", or the like, as shown in FIG. 8.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting insert for effective chip control, comprising: a polygonal body having an upper chip surface, a bottom surface and peripheral edge surfaces extending therebetween, the peripheral edge surfaces intersecting the upper chip surface to form main cutting edges therewith, the upper chip surface defining a chip face including a chip former, the chip former comprising a wall extending downwardly from an elevated plateau to one of the peripheral edge surfaces defining a radius (R1) therebetween, the downwardly-extending wall having a plurality of chip forming grooves and a rib formed between each groove, each groove extending from the elevated plateau toward but not extending entirely to one of the peripheral edge surfaces, each groove including a bottom wall, a first side wall and a second side wall, wherein the rib is formed by the second side wall of one groove and the first side wall of an adjacent groove, and wherein a top surface of the rib is approximately equal in elevation to the downwardly-extending wall.

2. The cutting insert of claim 1, wherein a width of each chip forming groove is approximately equal to a width of each rib.

3. The cutting insert of claim 1, wherein the wall comprises a concave-shaped wall that slopes downward a distance (D1) from the elevated plateau to one of the peripheral edge surfaces.

4. The cutting insert of claim 1, wherein the wall has a length (L2) from the elevated plateau to one of the peripheral edge surfaces.

5. The cutting insert of claim 1, wherein the wall forms an angle of forty-five degrees or less at a point where the wall intersects the elevated plateau.

6. The cutting insert of claim 1, wherein the first side wall forms a first angle with respect to a plane perpendicular to the bottom wall, and wherein the second side wall forms a second angle with respect to the plane perpendicular to the bottom wall.

7. The cutting insert of claim 6, wherein the first angle is different than the second angle.

8. The cutting insert of claim 7, wherein the first angle is approximately forty-five degrees or less, and wherein the second angle is approximately ten degrees or less.

9. A cutting insert of claim 1, wherein the peripheral edge surfaces comprises a first portion having a first length (L1) and a second portion having a second length (L2).

10. The cutting insert of claim 9, wherein the first length (L1) is approximately equal to the second length (L2).

11. The cutting insert of claim 9, wherein the first portion is formed at an angle with respect to the second portion.

12. The cutting insert of claim 11, wherein the angle is approximately equal to thirty degrees.

13. The cutting insert of claim 9, further comprising an obtuse corner separating the first portion from the second portion.

14. The cutting insert of claim 9, wherein the wall slopes downward a length (L4) from the elevated plateau to the first portion.

15. The cutting insert of claim 1, wherein the polygonal body comprises a trigon.

16. The cutting insert of claim 1, wherein the wall includes five chip forming grooves and four ribs.

17. The cutting insert of claim 1, wherein the radius (R1) is approximately equal to 0.375 inches.

* * * * *